United States Patent

LeBlanc et al.

[11] 4,196,65

[45] Apr. 8, 198

[54] FLUID MOTOR

[75] Inventors: Louis H. LeBlanc; Arthur A. Michaud, both of Claremont, N.H.

[73] Assignee: Joy Manufacturing Company, Pittsburgh, Pa.

[21] Appl. No.: 648,372

[22] Filed: Jan. 12, 1976

[51] Int. Cl.² ............................................. F16J 1/04
[52] U.S. Cl. ...................................... 92/233; 92/209; 173/134
[58] Field of Search ................. 92/152, 209, 233, 210; 173/134

[56] References Cited

U.S. PATENT DOCUMENTS

| | | | |
|---|---|---|---|
| 1,051,371 | 1/1913 | Kingan | 137/625.2 |
| 2,700,373 | 1/1955 | Feucht | 173/13 |

FOREIGN PATENT DOCUMENTS

A 15446  3/1952  Fed. Rep. of Germany ............. 92/20

*Primary Examiner*—Abraham Hershkovitz
*Attorney, Agent, or Firm*—J. Stewart Brams

[57] ABSTRACT

A fluid motor and more particularly a fluid motor having an improved piston head structure.

10 Claims, 3 Drawing Figures

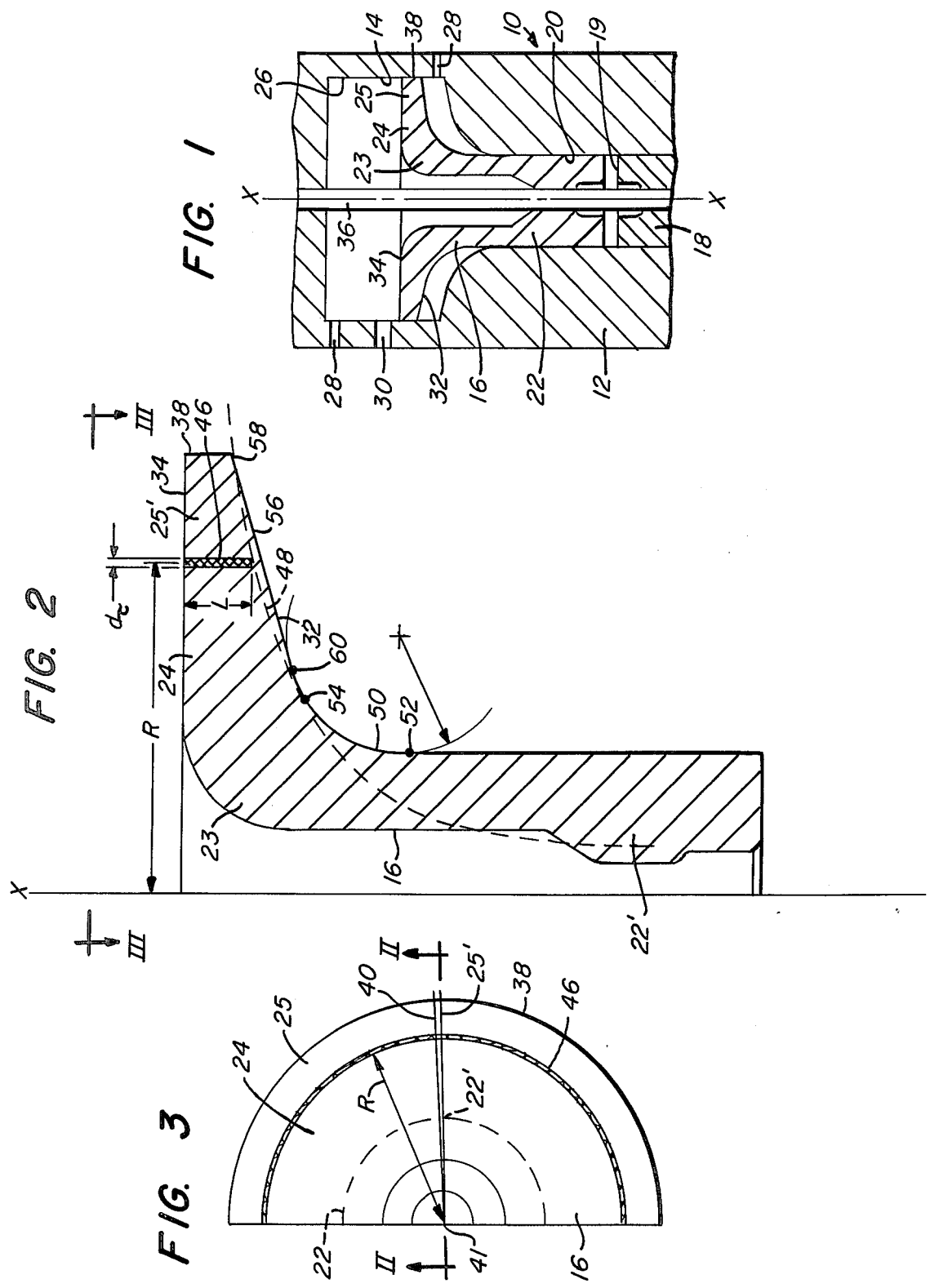

FLUID MOTOR

The linear motors known heretofore in the art of fluid powered motors have commonly comprised a movable piston member reciprocal within a motor casing in response to actuation thereof by pressurized fluid means. For example, such motors have commonly been provided to drive percussive tools such as pavement breakers or rock drills wherein the piston member is a hammer piston adapted to repetitively, percussively engage an impact element such as a striking bar or anvil block.

The piston members of such motors, and particularly those of pneumatic motors employed to drive percussive tools, have often included an elongated relatively small diameter stem portion having adjacent one longitudinal end thereof a relatively larger diameter driving head portion upon which the pressurized gas acts to drive the piston. Owing to various well known considerations of safety and practically as well as to equipment design limitations, relatively low driving gas pressures have been employed in such linear motors, for example on the order of 75 to 125 psig, and accordingly in order to maximize the total driving force available from such limited gas pressures the driving head portion of the piston has commonly been formed as a relatively large, thin disk having generous transverse faces upon which the pressurized gas acts to drive the piston in its reciprocal travel. Although such piston head configurations have generally served the purposes intended, they have nevertheless often been subject to certain serious deficiencies. For example, the design of a piston head for optimal mass distribution and strength has been difficult and design criteria have in some cases been inappropriate or contradictory. Thus a too thin piston head section will not comprise enough material to adequately support the stresses imposed thereon during the reciprocal travel of the piston and particularly during impact, while a too thick head section will be too massive for practical use in high frequency motors. Additionally, in pistons designed according to prior practice the piston head material or mass has not been suitably distributed to adequately resist fagigue, and accordingly such pistons have often failed in fatigue after extended operation, particularly in higher power motors, in or near the section where the piston head joins the stem.

The hereinabove described deficiencies of the prior art are overcome by the present invention according to which there is provided a novel piston head incorporating an equal mass design criterion whereby the elemental mass of the piston head at any diameter thereof is substantially constant in the manner of a uniform cross section cantilever beam such that the material of the piston head is distributed to provide maximum benefit in terms of mass distribution, stress support and fatigue resistance.

These and other objects and advantages of the instant invention are more fully described in the following description with reference to the accompanying figures, in which:

FIG. 1 is an axial section of a fragmentary part of a linear pneumatic motor having a piston constructed according to the principles of the present invention;

FIG. 2 illustrates a portion of the piston of FIG. 1 as seen from line 2—2 of FIG. 3; and FIG. 3 is an end view of the piston taken on line 3—3 of FIG. 2.

There is generally indicated at 10 in FIG. 1 a port of a fluid motor generally of a type used to power p cussive tools such as rock drills and the like, and ill trated in simplified form for purposes of clarity. course it is to be understood from the outset that si simplification is not intended to unduly limit the scc of the invention described inasmuch as the invent: may be adapted to a wide variety of motor designs use in a wide variety of applications.

Accordingly, as shown the motor 10 comprise: rigid casing or body member 12 having a stepped cyl drical bore 14 extending longitudinally therewithin an axis X—X. A generally stepped hammer piston 1( reciprocably carried within the bore 14 and as sho· includes an elongated cylindrical stem portion 22 whi extends forwardly or toward the bottom of FIG within a smaller diameter forward portion 20 of bore and a relatively larger diameter, generally disk-l head portion 24 rigidly affixed coaxially adjacent rearward end of stem 22 within a larger diameter re ward portion 26 of bore 14. The piston 16 is reciproi ble within bore 14 to repetitively, percussively engag rearward end portion 19 of an impact member shown a striking bar 18 which also extends within bore porti 20 forwardly of stem 22. Inasmuch as such motors ; well known in the art further detailed descripti thereof is omitted herefrom. Suffice it to note in t regard that the motor 10 includes fluid inlet passagew means 28 and a fluid exhaust means 30 extending witl casing 12 and communicating intermediate any suital source of pressurized gas flow external to the motor (not shown) and the bore portion 26 whereby any st able valving means (also not shown) cooperable w the pressurized gas flow source directs such pressuriz gas to act alternately upon respective forward and re ward transverse faces 32–34 of head portion 24 to rec rocate the piston 16 within bore 14 for repetitive i pacting upon striking bar 18 in the well known mann Also illustrated in FIG. 1 is one refinement to t motor 10 in the form of an elongated tube means extending coaxially within bore 14, piston 16 and str ing bar 18. Such a tube 36 would commonly be e ployed in a motor adapted to drive a percussive drilli apparatus, for example to deliver flushing liquid axia through the motor 10 to the drill hole or to cool the d motor. It is to be understood that this and various otl well known modifications and refinements to the cc figuration of motor 10 are contemplated inasmuch such refinements do not limit the invention her( which solely concerns configuration of the piston 16 described hereinbelow.

It will be seen by reference to FIG. 1 that the he portion 24 of piston 16 may be considered as a so cantilever beam comprised of a disk-like flange porti 25 rigidly affixed coaxially adjacent an upper end p· tion of stem 22 and integral therewith as at 23, a extending radially outwardly therefrom to an outerm cylindrical periphery 38 thereof. That is to say, 1 piston 16 may be considered to be the sum of a lai number of arbitrarily small elemental angular pisl sections 40 (FIG. 3) each of which has an apex 41 co cident with axis X—X and extends axially through 1 length of piston 16 such that in side elevation each s tion 40 exhibits a profile as shown in FIG. 2. Thus each angular section 40 a sectional stem portion constitutes the supporting structure for a cantile· beam comprised of a sectional flange portion 25′ affi> adjacent an upper end of the stem portion 22′ and g outwardly therefrom to its free end defined by ter periphery 38. Accordingly, during the reciprocation of piston 16 by gas pressure means as described above the flange portion 25' of each section 40 sustain the axial loading of the pressurized gas he included portions of the piston faces 32 and 34 manner of a cantilever beam. Additionally, at the piston downward travel each individual flange n 25' is subjected to large downwardly directed l forces due to the rapid deceleration of the piston it impacts upon striking bar 18. Accordingly, it e seen that inasmuch as the piston 16 may be d as being made up of a circular contiuum of sive elemental angular sections 40, each of which ises in effect a cantilever beam structure and all ; a common apex, the overall structure of piston iortion 24 constitutes a solid disk shaped cantileam having its support located coaxially with rehereto.

ing piston reciprocation the head portion 24 is t to gas pressure loading and inertial loading in inner of a cantilever beam as hereinabove indi-Thus, for purposes of simplified illustration and te the structure of flange 25 to a cantilever beam ire in the following description, the radially inner n of flange 25 which is affixed to stem 22 will be d to as the fixed end of the flange, and the raditermost cylindrical periphery 38 will be referred he free end of the flange, even though it will of be apparent from the explanation hereinabove ie fixed and free end portions of flange 25 form itric circles owing to the disk-like form of head n 24.

ording to the principles of the instant invention it en found that the head portion 24 will be best to support the stresses imposed thereon by gas re loading and piston acceleration if the mass of 25 is uniformly distributed intermediate the fixed d the free end thereof, which uniform mass distriis analogous to that of a cantilever beam of unicross section. In the case of the present diskl cantilever beam, uniform mass distribution rethat any elemental mass 46 (FIG. 2) at a radius R he axis X—X will be equal to any other such ital mass at any other radius of the flange 25. as shown in FIGS. 2 and 3, the elemental mass 46 ises a circular mass ring of radius R having a ntial thickness $d_t$ (FIG. 2) in the radial direction length L in the axial direction. It will be apprecinat in order to fulfill the stated requirement for m mass distribution at any radius of the flange 25, ial length L of mass element 46 must vary iny as the radius R thereof. That is, as the radius R eased the length L must decrease, and as the R is decreased the length L must increase. This come readily apparent upon consideration of the eters defining the volume of the element 46, is proportional to mass and therefore must reonstant for all elements 46 to provide the desired m mass distribution. Accordingly, by application idard analytical techniques and a knowledge of try of the piston head portion 24 as described above, a hyperbolic curve 48 shown in dashed FIG. 2 may be generated which defines the axial L, as referenced from the flat upper face 34, to e uniform mass distribution at all radii of the 25. In terms of physical configuration, the curve resents the profile of the lower face 32 which in conjunction with a flat upper face 34, will provide a uniform mass distribution in flange 25.

Of course it will be evident that the basic piston design must be developed empirically by conventional techniques taking into account the mass and strength characteristics of the material to be used, and the magnitude of forces to be imposed on the piston. It is therefore quite possible to design a piston using the uniform mass distribution criterion described hereinabove which will be totally inadequate to support large loading as in a rock drill. However, for a piston designed to be adequate for a given application by known design techniques and generally of the configuration indicated hereinabove, the curve 48 for that piston will provide a much improved mass distribution in the piston head. That is, for such a piston of any given mass the curve 48 represents an optimal distribution of the mass in the piston head in that the mass is so distributed as to be most beneficial in the support of loads imposed on the piston head during operation. The uniform mass distribution described hereinabove is particularly well adapted to the prevention of piston head fatigue failure in the area 23 where the head flange 25 joins the piston stem 22. Such fatigue failure has been commonplace in the prior art hammer pistons.

In practice, machining a hyperbolic profile such as curve 48 is an extremely difficult and expensive process. Thus for purposes of simplification and economy the profile curve 48 may be approximated by a combination of more easily machined line and curve segments such as a circular arc and tangent straight line combination as follows. The center of a circular blend radius arc 50 for blending the periphery of stem 22 smoothly into face 32 is chosen so that the arc 50 is tangent to the periphery of stem 22 as at 52 and also approaches or touches, but does not fall within (i.e. above) the constant mass curve 48, as for example at 54 where as shown the arc 50 tangentially meets curve 48. The radius of arc 50 is chosen by conventional design practice so as to avoid the inherent stress concentrations of a too small blend radius, and likewise to avoid the excess material requirements of a too large blend radius. It has been empirically established that the arc 50 should have a radius no less than one eighth of the difference between the head 24 and stem 22 outer diameters, and preferably about one fourth of the difference between the head 24 and stem 22 outer diameters. A larger radius may be used, of course, but such larger radius will deviate further from the curve 48 and thus will define an unnecessarily massive piston head. A straight line segment 56 is then constructed extending from the lower edge 58 of the outer periphery 38 to a point of tangency with arc 50 as at 60 whereby the combination of arc 50 from point 52 to point 60 and line 56 from point 60 to point 58 constitutes a close approximation of the uniform mass curve 48. The combined circular arc and straight line approximation as described provides a profile for face 32 which does not at any point fall within (above) the curve 48 whereby a piston head constructed according to this approximation will at all radii thereof comprise sufficient axial length L to satisfy the equal mass criterion represented by curve 48. That is, at no point will such a piston head have an axial dimension smaller than that required by curve 48, which smaller axial dimension would constitute a marginal piston design comprising less than the minimum acceptable mass for the given piston.

According to the description hereinabove there is provided a piston head design wherein piston head elemental mass at any radius thereof is substantially constant, whereby a much improved piston head configuration is provided. Notwithstanding the reference hereinabove to a specific preferred embodiment of the invention, it is to be understood that the invention herein may be practiced in various embodiments with numerous modifications thereto without departing from the broad spirit and scope thereof. For example: it is contemplated that the upper face of the piston head need not necessarily be flat so long as the equal mass criterion is maintained in relation to the lower face; the piston may have a head portion intermediate stem portions extending in opposite directions; the motor 10 may assume a wide variety of design configurations; and the like.

These and other embodiments and modifications having been envisioned and anticipated by the inventors it is respectfully submitted that the invention should be interpreted broadly and limited only by the scope of the claims appended hereto.

What is claimed is:

1. In a linear fluid actuated motor a piston comprising: an elongated cylindrical stem portion; a cylindrical head portion coaxial with respect to said stem portion; said piston being adapted to be actuated by the application of pressure fluid force to at least one axial side of said head portion; the outer diameter of said head portion being larger than the outer diameter of said stem portion; and the elemental mass of said head portion at any intermediate diameter thereof radially intermediate the respective said outer diameters of said head and stem portions being substantially a constant.

2. A piston as claimed in claim 1 wherein said head portion defines a pair of axially spaced transverse faces extending intermediate the respective said outer diameters of said head and stem portions.

3. A piston as claimed in claim 2 wherein the axial spacing between said pair of faces is larger adjacent said outer diameter of said stem portion than adjacent said outer diameter of said head portion.

4. A piston as claimed in claim 2 wherein the axial spacing between said faces varies continuously intermediate the respective said outer diameters of said stem and head portions.

5. A piston as claimed in claim 4 wherein said continuous varying is a continuous decrease of said axial spacing from a maximum adjacent said outer diameter of said stem portion to a minimum adjacent said outer diameter of said head portion.

6. A piston as claimed in claim 5 wherein the profile of one of said faces is substantially flat.

7. A piston as claimed in claim 6 wherein the profile of the other of said faces comprises joined arcuate and linear line segments extending between the respective said outer diameters of said head and stem portion.

8. A piston as claimed in claim 7 wherein said arcuate segment is a circular arc tangent to said outer diameter of said stem portion and said linear segment is a straight line segment tangent to said circular arc and extending intermediate said circular arc and said outer diameter of said head portion.

9. A piston as claimed in claim 8 wherein the radius of said circular arc is no less than one eighth of the difference between said outer diameters of said head and stem portions.

10. A piston as claimed in claim 9 wherein the radius of said circular arc is approximately one fourth of the difference between said outer diameters of said head and stem portions.

* * * * *